United States Patent
Koh

(10) Patent No.: US 10,512,334 B1
(45) Date of Patent: Dec. 24, 2019

(54) FURNITURE HEIGHT ADJUSTMENT DEVICE

(71) Applicant: Tuang-Hock Koh, Taichung (TW)

(72) Inventor: Tuang-Hock Koh, Taichung (TW)

( * ) Notice: Subject to any disclaimer, the term of this patent is extended or adjusted under 35 U.S.C. 154(b) by 0 days.

(21) Appl. No.: 16/114,227

(22) Filed: Aug. 28, 2018

(51) Int. Cl.
*A47C 3/30* (2006.01)
*A47B 9/10* (2006.01)
*F16F 9/02* (2006.01)
*F16F 9/56* (2006.01)
*F16F 9/32* (2006.01)

(52) U.S. Cl.
CPC .............. *A47C 3/30* (2013.01); *A47B 9/10* (2013.01); *F16F 9/0227* (2013.01); *F16F 9/3228* (2013.01); *F16F 9/56* (2013.01)

(58) Field of Classification Search
CPC .. A47C 3/30; A47B 9/10; F16F 9/0227; F16F 9/3228; F16F 9/56
See application file for complete search history.

(56) References Cited

U.S. PATENT DOCUMENTS

| | | | | |
|---|---|---|---|---|
| 3,887,155 A * | 6/1975 | Bertalot | ............ | F16B 7/10 |
| | | | | 248/333 |
| 4,711,184 A * | 12/1987 | Wallin | ............ | A47B 9/10 |
| | | | | 108/147 |
| 6,189,843 B1 * | 2/2001 | Pfister | ............ | A47B 9/083 |
| | | | | 248/157 |
| 6,378,816 B1 * | 4/2002 | Pfister | ............ | A47B 9/083 |
| | | | | 248/157 |
| 9,380,866 B1 * | 7/2016 | Davis | ............ | A47B 9/20 |
| 9,743,755 B2 * | 8/2017 | Lin | ............ | B66F 3/26 |
| 10,342,327 B2 * | 7/2019 | Lin | ............ | A47B 9/10 |
| 2002/0050112 A1 * | 5/2002 | Koch | ............ | A47B 9/20 |
| | | | | 52/651.07 |
| 2017/0079424 A1 * | 3/2017 | Lin | ............ | B66F 3/26 |

\* cited by examiner

*Primary Examiner* — Anita M King

(57) ABSTRACT

A height adjustment device used on furniture includes an inner tube having multiple clamp portions and multiple contact portions extending from the inner periphery thereof. Multiple grooves are defined in the outer periphery of the inner tube. A pneumatic tube is inserted into the inner tube and clamped by the contact portions. The inner tube is located in an outer tube that has a bottom cap and a top cap. Multiple ridges extend from the inner periphery of the outer tube. Each reduced opening accommodates the ridge corresponding thereto. The pneumatic tube has a piston rod and is connected to the bottom cap of the outer tube. The piston rod drives the inner tube to move relative to the outer tube. Multiple roller units are connected to ridges and roll the grooves of the inner tube to reduce friction between the inner tube and the outer tube.

7 Claims, 6 Drawing Sheets

FURNITURE HEIGHT ADJUSTMENT DEVICE

BACKGROUND OF THE INVENTION

1. Fields of the Invention

The present invention relates to a height adjustment device, and more particularly, to a height adjustment device used on furniture such as desks, chairs and the like.

2. Descriptions of Related Art

The conventional furniture height adjustment device known to applicant includes a base unit, a chair unit and a buffering unit. The base unit has a base part and a hollow tube extends from the base part. The chair unit has an inner tube, a seat pad and a quick-release unit. The inner tube is retractably inserted into the hollow tube. The buffering unit has a link that is pivotably connected to the base unit. A top bar is pivotably connected to the top of the inner tube. A buffering member is connected between the bar and the link. When operating the quick-release unit, and adjusts the inner tube relative to the hollow tube, the buffering unit allows the seat pad to move relative to the base unit. When the desired height of the chair pad is reached, the quick-release unit is operated again to set the height.

However, the inner tube and the hollow tube lack proper anti-friction feature so that the inner tube and or the hollow tube are worn out after frequent operation.

The present invention is intended to provide a height adjustment device used on furniture that is designed to eliminate the drawbacks mentioned above.

SUMMARY OF THE INVENTION

The present invention relates to a height adjustment device used on furniture, and comprises an inner tube, an outer tube, a pneumatic tube and multiple roller units. The inner tube has multiple clamp portions and multiple contact portions extending from the inner periphery thereof, and multiple grooves are defined in the outer periphery of the inner tube and located corresponding to the contact portions. Each groove has a reduced opening, and a first face is formed as the inner bottom of the groove. Each reduced opening is defined by two ends, and each end of the reduced opening has a second face formed on the inside thereof. The pneumatic tube inserted into the inner tube and clamped by the contact portions. The outer tube has a bottom cap and a top cap. Multiple ridges extend from the inner periphery of the outer tube. Each ridge has an axial passage and an axial slot which communicates with the axial passage. The inner tube is located in the outer tube. Each reduced opening accommodates the ridge corresponding thereto. The top cap has multiple tongues extending from the inner periphery thereof. Each of the tongues covers the top of the axial slot corresponding thereto.

The pneumatic tube has a piston rod retractably inserted into the bottom end of the pneumatic tube, and the bottom end of the pneumatic tube is connected to the bottom cap of the outer tube. The piston rod drives the inner tube to move relative to the outer tube. The roller units are respectively engaged with the axial slots. Each roller unit has a plate which is inserted into the axial slot and reaches into the axial passage. Each plate has multiple roller connected thereto which rolls along the first and second faces of the grooves of the inner tube to reduce friction between the inner tube and the outer tube.

Preferably, the inner tube has a collar connected to the bottom end thereof by multiple bolts extending through the collar and connected to the clamp portions. The collar has a central hole through which the piston rod of the pneumatic tube extends. The piston rod has a threaded section. The bottom cap has a bore, and two nuts are located on the top and the underside of the bore. The threaded section of the piston rod extends through bore and are connected to the two nuts so as to connect the threaded section to the bottom cap.

Preferably, the collar has multiple protrusions which are engaged with the grooves of the inner tube.

Preferably, the clamp portions and the contact portions are located alternatively to each other.

Preferably, the contact portions each have two connection faces connected between the first face and the two respective second faces.

Preferably, the plates each have multiple notches defined in one side thereof. Two guide lugs extend from each of two opposite faces of the plate and define a space between the two guide lugs and the notch. A roller is rotatably located in the space and guided by the guide lugs. The rollers are located in the grooves.

Preferably, the width of each ridge is larger than the width of the guide lugs of the two opposite faces of each of the plates. The width of each reduced opening is larger than the width of each of the ridges. The width of each first face is larger than the width of each roller.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
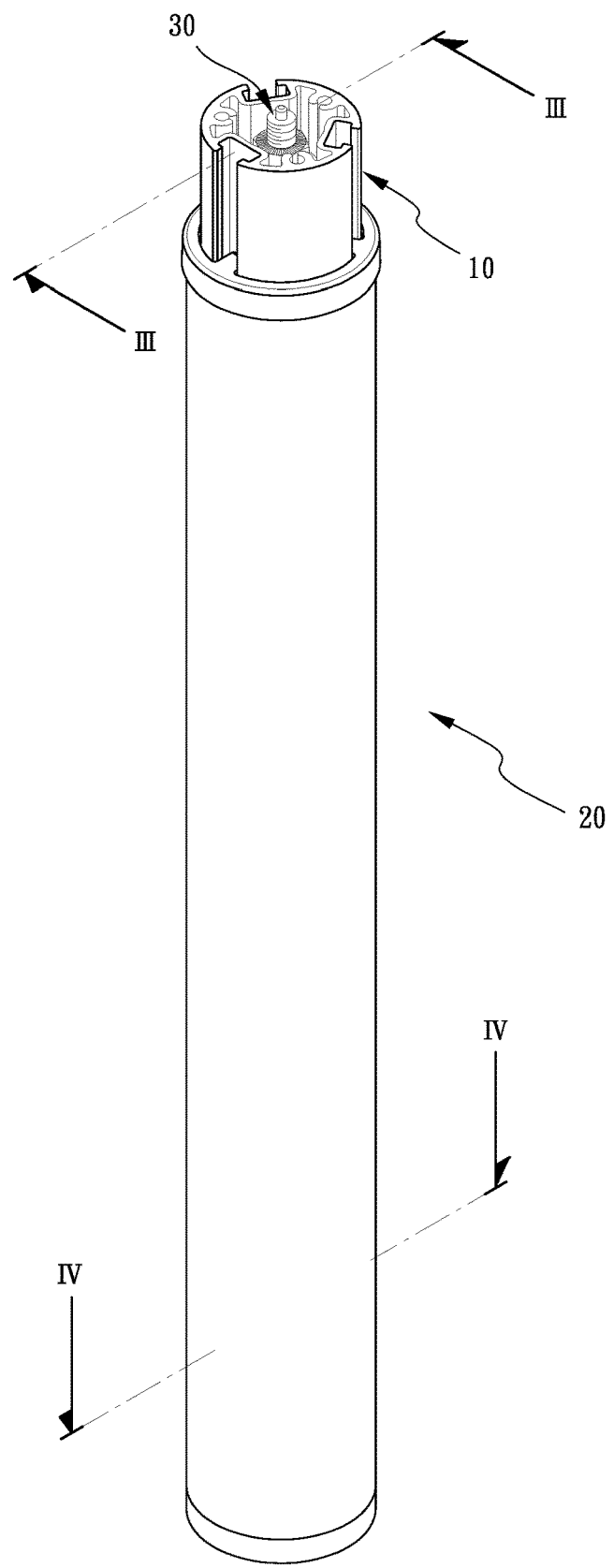
FIG. 1 is a perspective view to show the height adjustment device of the present invention.
Figure 2:
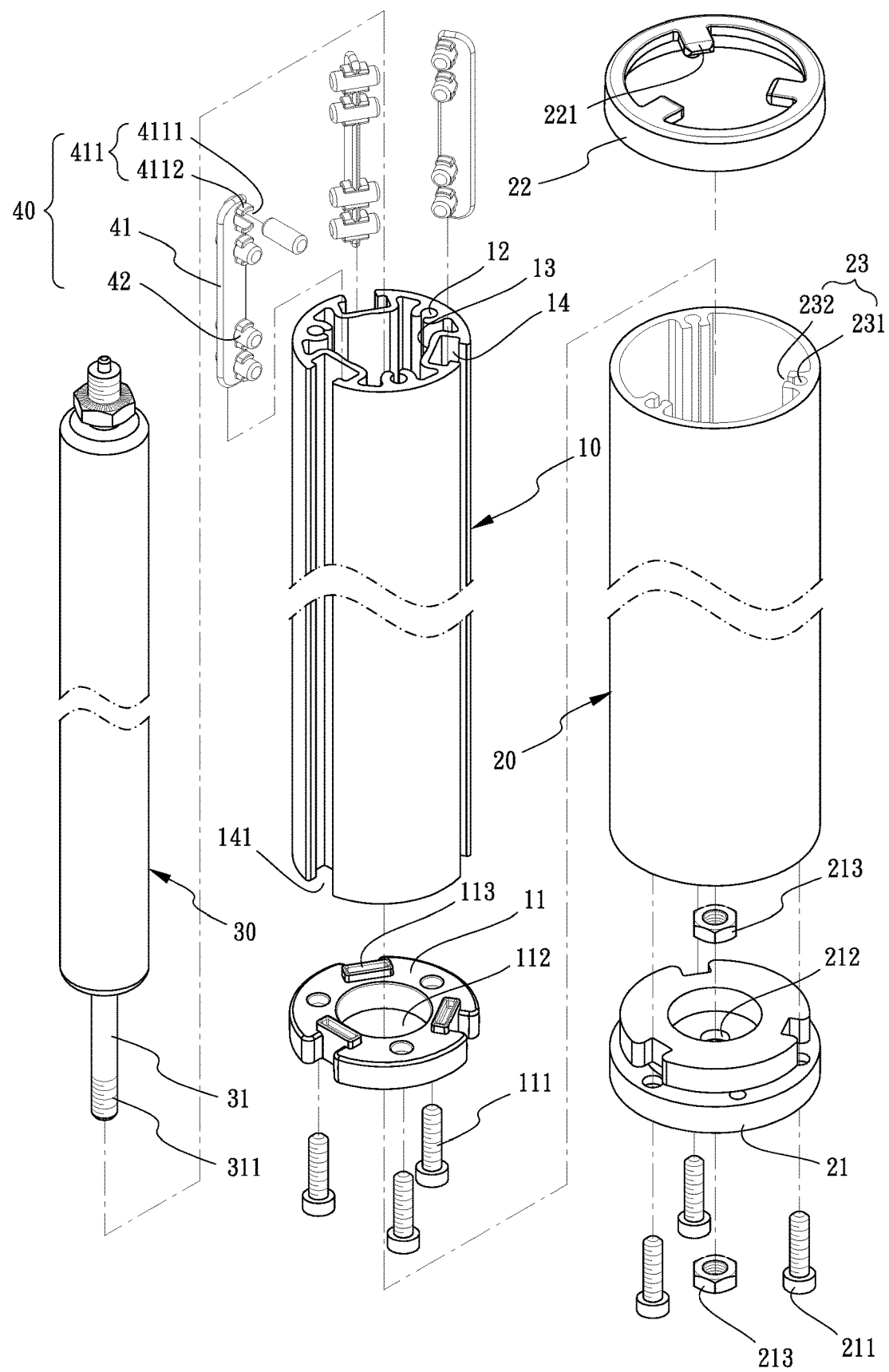
FIG. 2 is an exploded view of the height adjustment device of the present invention.
Figure 3:
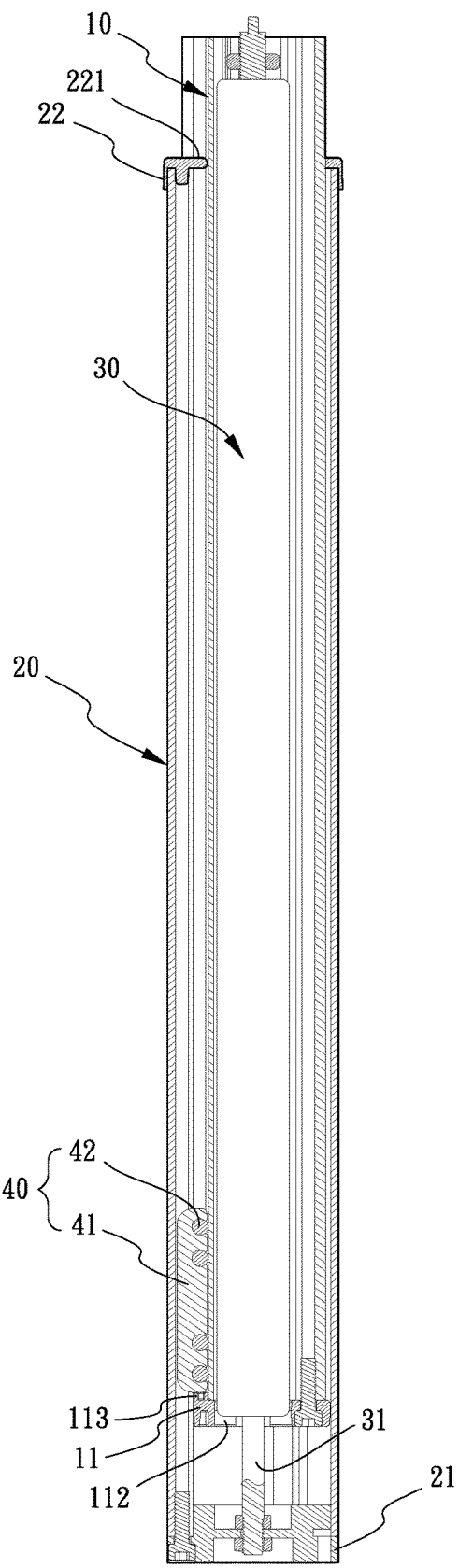
FIG. 3 is an cross sectional view, taken along line III-Ill of FIG. 1.

Referring to FIGS. 1 to 5, the height adjustment device of the present invention is connected to a desk top or a seat pad so as to adjust the height of the desk top or the seat pad. The height adjustment device comprises an inner tube 10 that has multiple clamp portions 12 and multiple contact portions 13 extending from the inner periphery of the inner tube 10, and extending along the inner tube 10. The clamp portions 12 and the contact portions 13 are located alternatively to each other. Multiple grooves 14 are defined in the outer periphery of the inner tube 10 and located corresponding to the contact portions 13. Specifically, the grooves 14 are defined by the contact portions 13 that extend radially inward from the inner periphery of the inner tube 10. Each groove 14 has a reduced opening 141, and a first face 142 is formed as an inner bottom of the groove 14. Each reduced opening 141 is defined by two ends, and each end of the reduced opening 141 has a second face 143 formed on the inside thereof. The contact portions 13 each have two connection faces 144 that are connected between the first face 142 and the two respective second faces 143. A pneumatic tube 30 is inserted into the inner tube 10 and clamped by the contact portions 13. The inner tube 10 has a collar 11 connected to the bottom end thereof. Multiple bolts 111 extend through the collar 11 and are connected to the clamp portions 12. Furthermore, the collar 11 has multiple protrusions 113 which are engaged with the grooves 14 of the inner tube 10 to reinforce the connection between the inner tube 10 and the collar 11.

An outer tube 20 has a bottom cap 21 and a top cap 22 respectively connected to the bottom end and the top end of the outer tube 20. Multiple ridges 23 extend from radially and inward from the inner periphery of the outer tube 20. Each ridge 23 includes an axial passage 231 and an axial slot 232 which communicates with the axial passage 231. The inner tube 10 is located in the outer tube 20, and each reduced opening 141 accommodates the ridge 23 corresponding thereto. The top cap 22 includes multiple tongues 221 extending from the inner periphery thereof, and each of the tongues 221 covers the top of the axial slot 232 corresponding thereto.

The pneumatic tube 30 includes a piston rod 31 that is retractably inserted into the bottom end of the pneumatic tube 30. The collar 11 on the bottom end of the inner tube 10 has a central hole 112 through which the piston rod 31 extends. The piston rod 31 has a threaded section 311. The bottom cap 21 has a bore 212, and two nuts 213 are located on the top and the underside of the bore 212. The threaded section 311 of the piston rod 31 extends through bore 212 and are connected to the two nuts 213 so as to connect the threaded section 311 to the bottom cap 21. When in operation, the piston rod 31 drives the inner tube 10 to move relative to the outer tube 20.

Multiple roller units 40 are respectively engaged with the axial slots 232. Each roller unit 40 has a plate 41 which is inserted into the axial slot 232 and reaches into the axial passage 231. Each plate 41 has multiple roller 42 connected thereto which rolls along the first and second faces 142, 143 of the grooves 14 of the inner tube 10 to reduce friction between the inner tube 10 and the outer tube 20. Specifically, the plates 41 each have multiple notches 411 defined in one side thereof. Two guide lugs 4112 extend from each of two opposite faces of the plate 41 and define a space 4111 between the two guide lugs 4112 and the notch 411. A roller 42 is rotatably located in each space 4111 and guided by the guide lugs 4112. The rollers 42 are located in the grooves 14. The width D2 of each ridge 23 is larger than the width D1 of the guide lugs 4112 of the two opposite faces of each of the plates 41. The width D3 of each reduced opening 141 is larger than the width D2 of each of the ridges 23. The width D5 of each first face 142 is larger than the width D4 of each roller 42.

Figure 4:
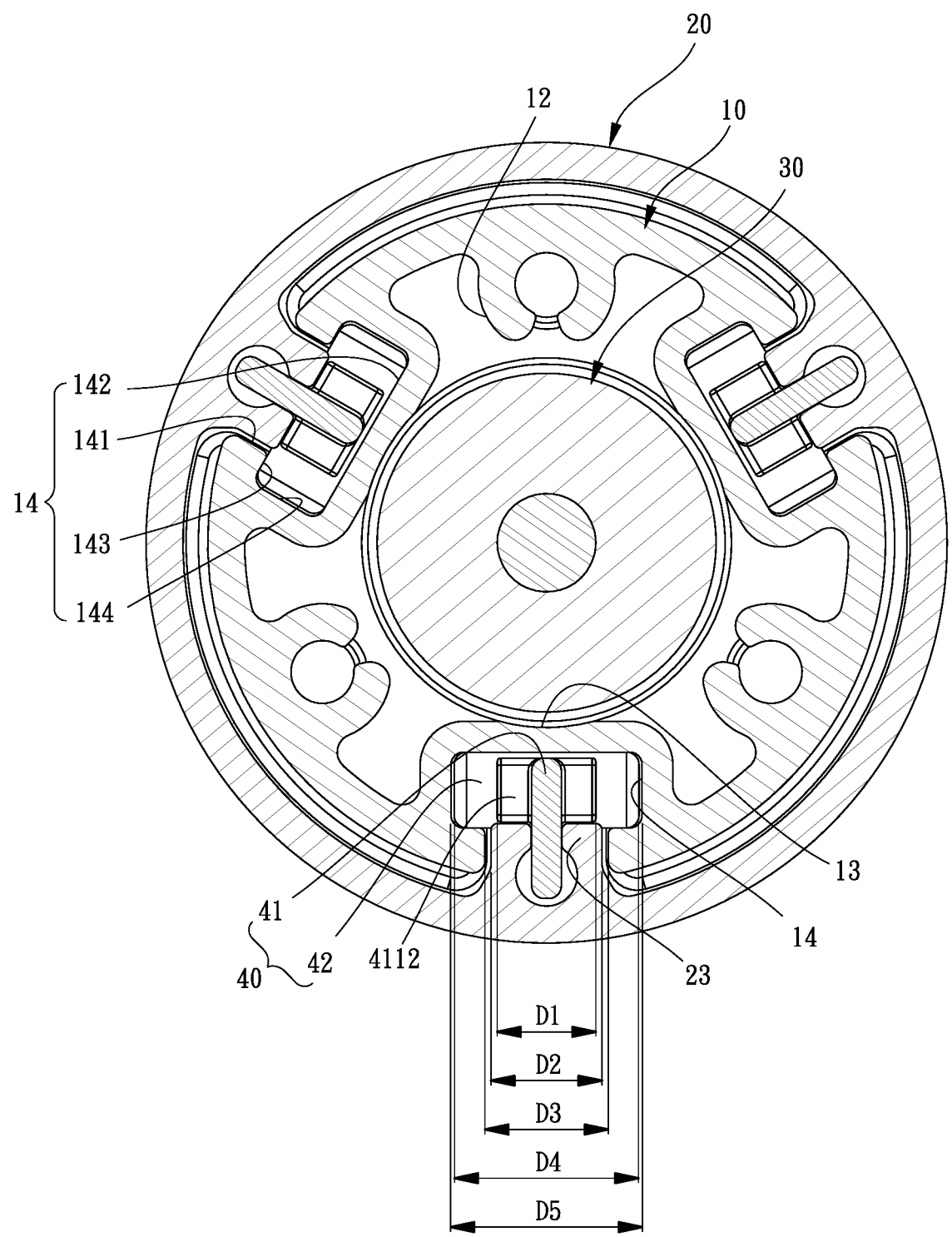
FIG. 4 is an cross sectional view, taken along line IV-IV of FIG. 1.
Figure 5:
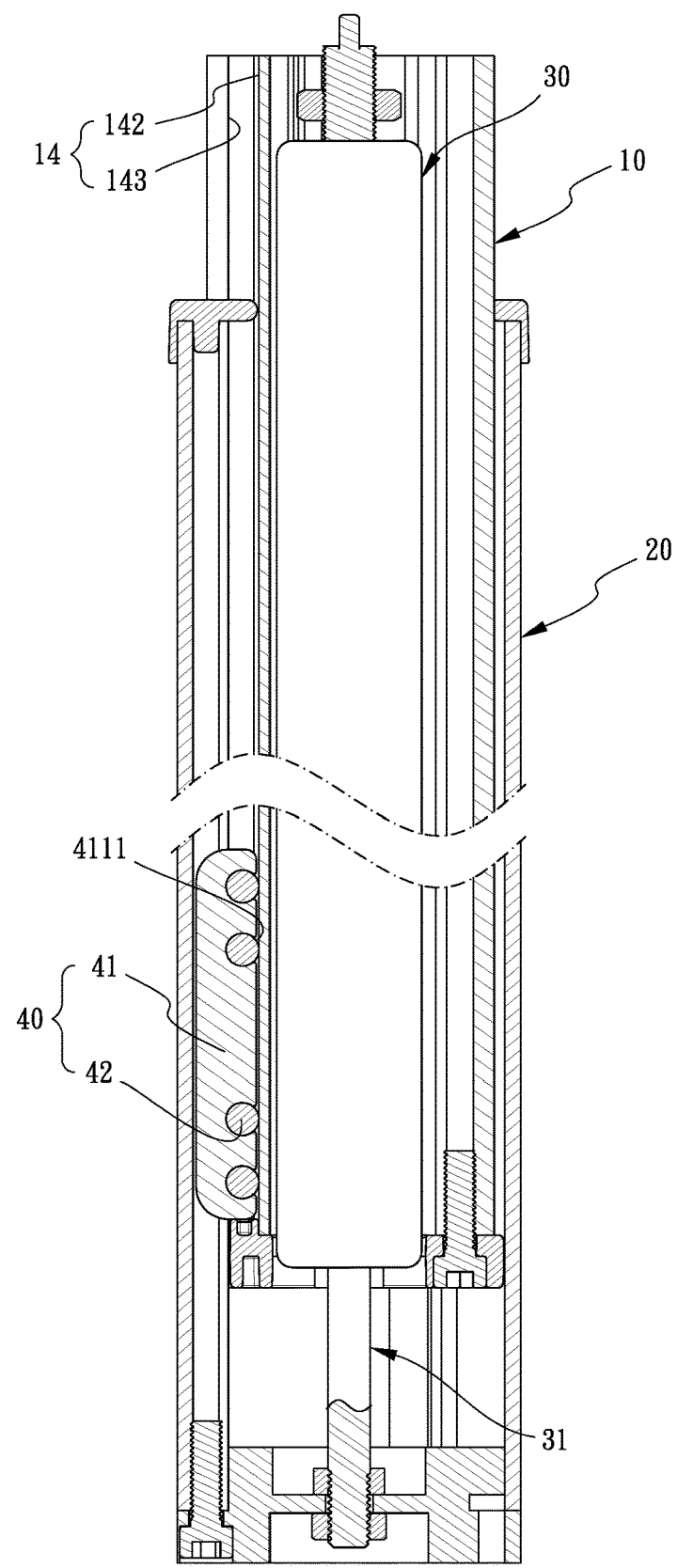
FIG. 5 is an enlarged view of the disclosure of FIG. 3.
Figure 6:
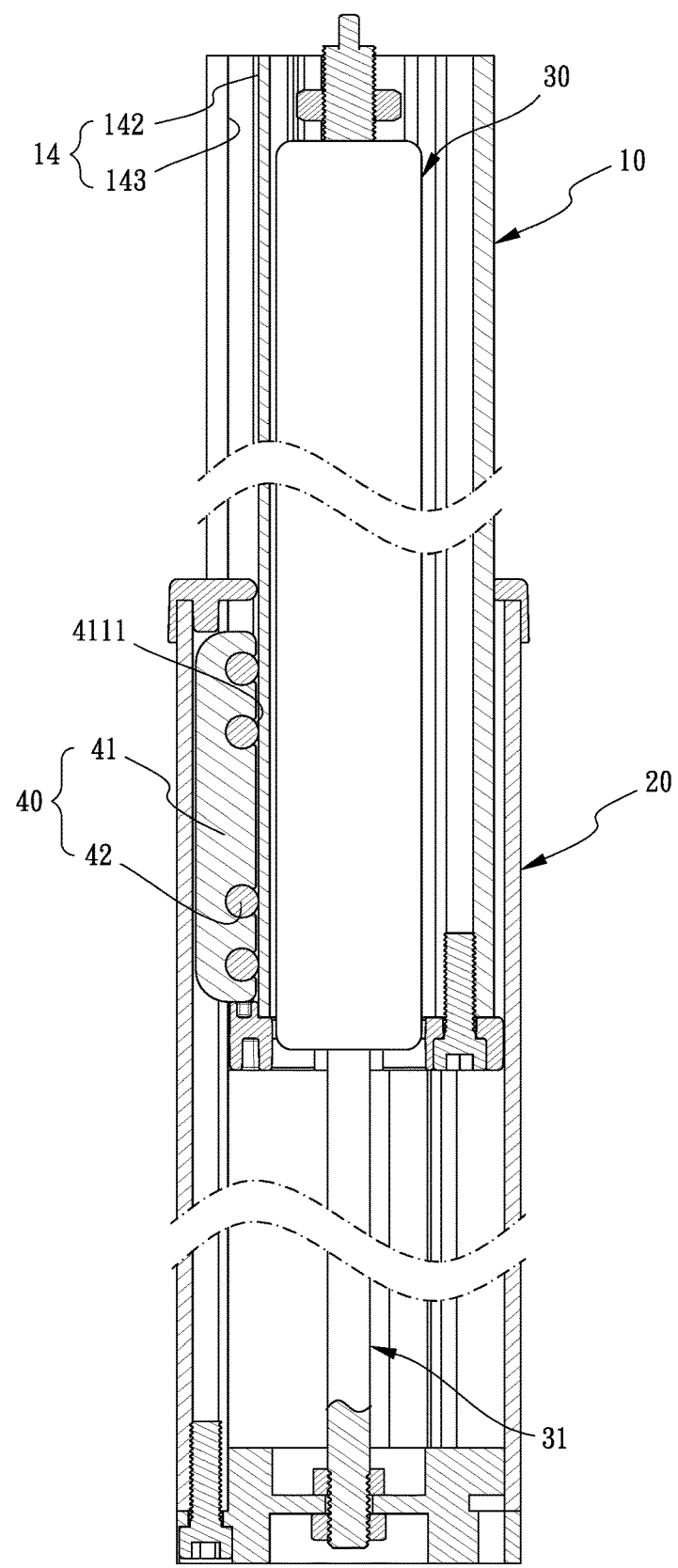
FIG. 6 shows that the inner tube is moved relative to the outer tube.

As shown in FIGS. 4 to 6, the rollers 42 are guided by the guide lugs 4112 and ensured to roll in a stable way. The pneumatic tube 30 is activated to move the piston rod 31 so that the inner tube 10 is moved upward or downward relative to the outer tube 20 as shown in FIGS. 5 and 6. The plate 41 of each roller unit 40 moves between the inner tube 10 and the outer tube 20. The rollers 42 of the roller units 40 roll along the first and second faces 142, 143, and the plates 41 move along the ridges 23 of the outer tube 20, such that the desk top or the seat pad (not shown) is moved upward or downward stably. The friction between the inner tube 10 and the outer tube 20 is reduced so that the life of the A height adjustment device can be prolonged.

While we have shown and described the embodiment in accordance with the present invention, it should be clear to those skilled in the art that further embodiments may be made without departing from the scope of the present invention.

What is claimed is:

1. A height adjustment device used on furniture, comprising:
   an inner tube having multiple clamp portions and multiple contact portions extending from an inner periphery thereof, multiple grooves defined in an outer periphery of the inner tube and located corresponding to the contact portions, each groove having a reduced opening, a first face formed as an inner bottom of the groove, each reduced opening being defined by two ends, and each end of the reduced opening having a second face formed on an inside thereof, a pneumatic tube inserted into the inner tube and clamped by the contact portions;
   an outer tube having a bottom cap and a top cap respectively connected to a bottom end and a top end of the outer tube, multiple ridges extending from an inner periphery of the outer tube, each ridge having an axial passage and an axial slot which communicates with the axial passage, the inner tube located in the outer tube, each reduced opening accommodating the ridge corresponding thereto, the top cap having multiple tongues extending from an inner periphery thereof, each of the tongues covering a top of the axial slot corresponding thereto;
   the pneumatic tube having a piston rod retractably inserted into a bottom end of the pneumatic tube, the bottom end of the pneumatic tube connected to the bottom cap of the outer tube, the piston rod driving the inner tube to move relative to the outer tube, and
   multiple roller units respectively engaged with the axial slots, each roller unit having a plate which is inserted into the axial slot and reaches into the axial passage, each plate having multiple roller connected thereto which rolls along the first and second faces of the grooves of the inner tube to reduce friction between the inner tube and the outer tube.

2. The height adjustment device as claimed in claim 1, wherein the inner tube has a collar connected to a bottom end thereof, multiple bolts extend through the collar and are connected to the clamp portions, the collar has a central hole through which the piston rod of the pneumatic tube extends, the piston rod has a threaded section, the bottom cap has a bore, and two nuts are located on a top and an underside of the bore, the threaded section of the piston rod extends through bore and are connected to the two nuts so as to connect the threaded section to the bottom cap.

3. The height adjustment device as claimed in claim 2, wherein the collar has multiple protrusions which are engaged with the grooves of the inner tube.

4. The height adjustment device as claimed in claim 1, wherein the clamp portions and the contact portions are located alternatively to each other.

5. The height adjustment device as claimed in claim 4, wherein the contact portions each have two connection faces connected between the first face and the two respective second faces.

6. The height adjustment device as claimed in claim 1, wherein the plates each have multiple notches defined in one side thereof, two guide lugs extend from each of two opposite faces of the plate and define a space between the two guide lugs and the notch, a roller is rotatably located in each of the spaces and guided by the guide lugs, the rollers are located in the grooves.

7. The height adjustment device as claimed in claim 6, wherein a width of each ridge is larger than a width of the guide lugs of the two opposite faces of each of the plates, a width of each reduced opening is larger than the width of each of the ridges, a width of each first face is larger than a width of each roller.

* * * * *